United States Patent [19]

Powell

[11] 3,997,569

[45] Dec. 14, 1976

[54] METHOD FOR PREPARING A LACTONE REACTION PRODUCT

[75] Inventor: Justin Christopher Powell, Wappingers Falls, N.Y.

[73] Assignee: Texaco Inc., New York, N.Y.

[22] Filed: Feb. 28, 1974

[21] Appl. No.: 446,844

Related U.S. Application Data

[63] Continuation-in-part of Ser. No. 304,675, Nov. 8, 1972, abandoned.

[52] U.S. Cl. .......................... 260/343.5; 260/343.6; 44/63
[51] Int. Cl.$^2$ ...................................... C07D 307/32
[58] Field of Search .................. 260/343.6, 343.5

[56] References Cited

UNITED STATES PATENTS

| | | | |
|---|---|---|---|
| 3,155,685 | 11/1964 | Prill et al. | 260/343.6 |
| 3,155,686 | 11/1964 | Prill et al. | 260/343.6 |
| 3,267,062 | 8/1966 | Prill et al. | 260/343.5 |
| 3,755,173 | 8/1973 | Kennedy et al. | 260/343.6 |

Primary Examiner—Henry R. Jiles
Assistant Examiner—C. Jaisle
Attorney, Agent, or Firm—T. H. Whaley; C. G. Ries; J. J. O'Loughlin

[57] ABSTRACT

Method for preparing a lactone reaction product comprising reacting an alkenylsuccinic acid under substantially anhydrous conditions in the presence of a protonating agent and at an elevated temperature ranging up to about 100° C., and a motor fuel composition containing said lactone reaction product.

17 Claims, No Drawings

METHOD FOR PREPARING A LACTONE REACTION PRODUCT

This application is a continuation-in-part of an application Ser. No. 304,675 filed on Nov. 8, 1972, now abandoned.

BACKGROUD OF THE INVENTION

FIELD OF INVENTION

The use of certain lactones or lactone reaction products as rust and corrosion inhibitors in hydrocarbon oil compositions is known. Thus, such a material as tetrapropenylsuccinic acid lactone has exhibited effectiveness as a rust inhibitor in gasoline.

The alkenylsuccinic acid lactones have been prepared by reacting an alkenylsuccinic acid with a hydrating mineral acid, such as 50 percent sulfuric acid, dilute hydrochloric acid or dilute sulfuric or phosphoric acid. In general, the reaction has been conducted at an elevated temperature ranging up to about 212° F. and in the presence of a nonpolar solvent, such as hydrocarbon i.e. naphtha, kerosene or the like. A feature of the known process is that the catalyst for the reaction has been employed in a hydrating environment, i.e. in an aqueous solution, such as 50 percent aqueous sulfuric acid or other dilute aqueous mineral acids.

The conventional method for preparing a lactone reaction product is relatively inefficient and produces a low yield of the desired product. In particular, the conventional method gives a poor yield of a lactone reaction product in which the alkenyl radical on the alkenylsuccinic acid reactant is a high molecular weight radical having from about 300 to 3,000 average molecular weight.

DESCRIPTION OF THE PRIOR ART

U.S. Pat. No. 3,248,187 discloses a hydrocarbon oil composition which has been inhibited against rust by the addition thereto of a lactone reaction product. This reference discloses the process of reacting an alkenylsuccinic acid in the presence of a dilute aqueous mincral acid and a hydrocarbon solvent at an elevated temperature to produce an alkenyl substituted lactone reaction product.

SUMMARY OF THE INVENTION

The method of the invention which is effective for preparing a relatively high molecular weight alkenyl substituted lactone reaction product comprises reacting an alkenylsuccinic acid in which the alkenyl radical has an average molecular weight ranging from about 300 to 3,000 in the presence of a protonating agent and under substantially anhydrous reaction conditions at an elevated temperature up to about 100° C. until a substantial proportion of the alkenylsuccinic acid has been converted to the lactone reaction product.

The motor fuel composition of the invention comprises a mixture of hydrocarbons in the gasoline boiling range containing a minor amount of the lactone reaction product prepared according to this process.

SPECIFIC EMBODIMENTS OF THE INVENTION

According to the method of this invention, a high molecular weight alkenylsuccinic acid, in which the alkenyl radical has a molecular weight ranging from about 300 to 3,000, is admixed with a catalyst, electron pair acceptor or a protonating agent to form a reaction mixture. The catalyst, generally a concentrated mineral acid, can be added next to the alkenylsuccinic acid-containing reaction mixture. The temperature of the reaction mixture is then raised up to about 100° C. to promote lactone formation while maintaining substantially anhydrous reaction conditions. The reaction is continued under these conditions for sufficient time to effect conversion of a substantial portion of the reactant to a lactone reaction product. It is convenient to follow the process of the reaction by withdrawing samples during the reaction and subjecting them to infrared radiation. The formation of alkenyl substituted 5 and 6 membered ring lactone reaction products is shown by infrared radiation at 5.66 and 5.78 micrometer regions. Thus, by utilizing the infrared analysis or correlated reaction times, it is possible to insure conversion of a major portion or substantially all of the alkenylsuccinic acid to a lactone reaction product.

The alkenylsuccinic acid reactant employed in this process is represented by the following formula:

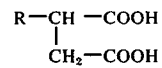

in which R represents an alkenyl radical having an average molecular weight ranging from about 300 to 3,000. A more preferred reactant is an alkenylsuccinic acid in which the alkenyl radical has an average molecular weight from about 700 to 2,000. The most preferred reactants are those alkenylsuccinic acids in which the alkenyl radical has an average molecular weight ranging from about 800 to 1,200.

It will be understood that the prescribed alkenylsuccinic acid reactant can be prepared from the corresponding alkenylsuccinic anhydride. Specifically, an alkenylsuccinic anhydride and water can be reacted in equimolar amounts to form the prescribed alkenylsuccinic acid reactant in accordance with known methods. Thus, the present invention contemplates that an alkenylsuccinic anhydride can be employed as a precursor to the reactant in this process by undergoing the hydrolysis reaction noted.

This process is also conveniently conducted by dissolving the prescribed alkenylsuccinic acid in an inert non-hydrating solvent such as a hydrocarbon solvent. A suitable solvent is a mineral oil having an SUS viscosity at 100° F. ranging from about 50 to about 1,000. Other suitable hydrocarbon solvents for this process include kerosene, benzene, xylene and the like.

The interesterification reaction or formation of a lactone reaction product in the present invention is conducted in the presence of an acid catalyst. The catalyst may be any protonating agent or electron pair acceptor i.e. any material which can provide a hydrogen ion or accept a pair of electrons to catalyze the reaction. The protonating agent or electron pair acceptor employed should provide from about 0.25 to 1.5 moles of protons or electron acceptors per mole of the alkenylsuccinic acid being reacted although smaller or larger amounts can be employed with compromises in efficiency and/or economy. It is preferred to employ a protonating agent or electron pair acceptor which provides from about 0.5 to 1 moles of proton or electron pair per mole of alkenylsuccinic acid. These ranges can be also expressed as 0.25 to 1.5 or 0.5 to 1 equivalents of acid per mole of the alkenylsuccinic acid moiety.

A variety of protonating agents or electron pair acceptors can be employed in the present process. Included among these are the mineral acids such as sulfuric acid and perchloric acid. Organic acids including p-toluene sulfonic acid hydrate, electron pair acceptors such as boron trifluoride etherate, and solid acid catalysts such as sulfonic acid ion exchange resins are suitable. There appears to be criticality in the catalyst since formic acid, oxalic acid and aqueous hydrochloric acid are either inoperative or have little effect on the process.

The reaction is normally conducted at a temperature ranging from about 25° C. up to about 100° C. with a range from about 60° to <100° C. being especially suitable. A preferred temperature range for this process is from about 70° to 98° C. Highly efficient conversions have been realized employing a temperature in a preferred range, namely from about 85° to 95° C. A temperature of 100° C. or above should be avoided because these temperatures tend to decrease conversion and lead to the production of undesirable reaction products.

A critical feature of the process of this invention for the production of a high molecular weight alkenyl substituted lactone reaction product is that it be conducted under substantially anhydrous conditions. The reactant, solvent and the catalyst or the protonating agent must all be selected so as to insure substantially anhydrous and preferably essentially anhydrous reaction conditions. By substantially anhydrous reaction conditions is meants that the reaction mixture should contain no more than about 5 percent water. It is preferred that this mixture contain no more than about 2 percent water with the most preferred situation being an essentially anhydrous reaction mixture. The surprising improvement in yield of high molecular weight alkenyl substituted lactone reaction product is attributed to the use of the described substantially anhydrous reaction conditions.

The following example illustrates a known lactone process employing an unconventional high molecular weight polyisobutenylsuccinic acid:

EXAMPLE I

POLYISOBUTENYLSUCCINIC ANHYDRIDE REACTION USING AQUEOUS MINERAL ACID

To a solution of 126 g. of a 50 wt. % oil solution of crude polyisobutenylsuccinic acid (prepared from polyisobutene of 1300 molecular weight and maleic anhydride by thermal alkenylation with about 50% unreacted polyisobutene) in 125 ml. of hexane, 100 g. of 50 wt. % sulfuric acid in water was added. The mixture contained about 0.025 moles of polyisobutenylsuccinic acid and about 0.5 moles of sulfuric acid or about 1.0 moles of available protons. After stirring 1 hour at about 25° C. an aliquot is diluted with water, extracted with hexane, and the hexane extract separated. Infrared analysis of the residue obtained by evaporation of the hexane under nitrogen with mild heating shows lactone and anhydride formation to an incomplete degree. After 4 hours the temperature of the mixture was 29° C. and an infrared analysis as above showed much less anhydride and lactone formation compared to the one-hour sample.

The mixture was then heated to reflux. The mixture temperature was about 74° C. Infrared analysis after 80 minutes of refluxing (method as above) indicated small amounts of lactone and anhydride were formed, but that the starting material, polyisobutenylsuccinic acid was predominately unchanged. After 17 hours and 20 minutes of refluxing, infrared analysis indicated relatively little change in reaction mixture composition as compared to the 80-minute reaction mixture composition.

The mixture was cooled to room temperature and washed with water and co-solvents unitl the wash water was about a pH of 5. The organic phase was separated and flash evaporated. The residue was held at 95°C. at about 20 mm Hg pressure for about 12 hours to remove solvent traces. By infrared analysis the final product appears to be largely polyisobutenylicsuccinic acid with a small amount of anhydride present and little if any lactones. The amount of lactones present cannot be greater than 15 mole % and are probably less than 5 mole %.

Upon repeating this example, no change was noted in the starting material by infrared analyses at 15, 30, 60 and 90 minutes in the initial phase (25° C.) described above and this work was discontinued.

The following examples illustrate the novel process of this invention:

EXAMPLE II

A mixture of 126 g. (0.025 mole) of crude polyisobutenylsuccinic acid (containing about 50% unreacted polyisobutene of about 1300 average molecular weight) in a 50 wt.% mineral oil solution and 1.25 g. (0.0125 mole) of sulfuric acid is mixed at 90° C. for 3 hours. The infrared spectrum of the product indicates high conversion to five- and six- membered lactones. The yield of lactones is greater than 85 mole %.

EXAMPLE III

A mixture of 2,570 g. (1.0 mole) of crude polyisobutenyl succinic anhydride (containing about 50% unreacted polyisobutene of about 1300 average molecular weight) and 25 g. (0.25 mole) of about 96% aqueous sulfuric acid and 18 g. (1.0 mole) of water were heated and stirred at 90° C. for about 1 hour and then allowed to cool to room temperature. The mineral acidity can be removed by extraction but the product can be used without further purification. Infrared analysis indicates high conversion to lactones as in Example II.

EXAMPLE IV

A mixture of 1058 g. (0.5 mole) of crude polypropenylsuccinic anhydride (containing about 50% unreacted polypropene of about 850 average molecular weight) were heated to about 90° C. with stirring. Over a period of about 4 minutes, 21.5 g. of a solution consisting of 12.5 g. of about 96% sulfuric acid and 9.0 g. (0.5.mole) of water were added dropwise. After 4 hours the mixture was allowed to cool. This product has similar strong lactone absorptions in its infrared spectrum to Example I and give the following analysis.

| | |
|---|---|
| ASTM D-94 Saponification Number | 94.5 |
| ASTM D-974 Total Acid Neut. Number | 55.0 |
| Iodine Number | 7.8 |
| Average Molecular Weight (by vapor pressure osmometry) | 955 |

EXAMPLE V

A mixture of 270 g. (1.0 mole) of tetrapropenylsuccinic anhydride, 18.0 g. (1.0 mole) of water, and 51.5. g. (0.5 mole) of about 96% sulfuric acid and 100 ml. of xylene were heated to reflux at atmospheric pressure for 2 hours and allowed to cool. The product was mixed with ethyl ether and hexane and the organic phase extensively washed with water until the pH of the aqueous extract was repeatably between 4 and 5. The organic raffinate was filtered through diatomaceous earth, flash evaporated, and stripped of traces of solvent in a vacuum oven to obtain 260.1 g. of product. The infrared spectrum of the product indicated high conversion to five- and six- membered lactones by strong absorptions at 5.66 and 5.74 micrometers.

EXAMPLE VI

A mixture of 377.5 g. (0.05 mole) of crude polyisobutenylsuccinic anhydride (containing about 31% unreacted polyisobutene of about 400 average molecular weight) 12.5 g. (0.125 mole) of about 96% sulfuric acid, and 9.0 g. (0.5 mole) of water were heated to about 90° C. with stirring for 1 hour and allowed to cool. The product was washed free of mineral acidity by extraction and weighed 360.9 g. after handling-solvent evaporation. The product exhibited the same strong lactone absorptions in its infrared spectrum as the product of Example II.

Examples II through VI illustrate the effectiveness of the novel process of this invention for providing a substantial yield of high molecular weight alkenyl substituted lactone reaction products in contrast to prior methods. The lactone reaction products of this process are particularly effective as dispersants in motor fuel compositions.

I claim:

1. A method for preparing a high molecular weight alkenyl-substituted lactone reaction product comprising the step of admixing an alkenylsuccinic acid, said alkenyl radical having an average molecular weight ranging from about 300 to 3,000 with a protonating agent or electron pair acceptor selected from the group consisting of sulfuric acid, perchloric acid, p-toluene sulfonic acid, boron trifluoride etherate and sulfonic acid ion exchange resins to form a substantially anhydrous reaction mixture and reacting said mixture under substantially anhydrous reaction conditions at an elevated temperature up to about 100° C until infrared spectra at about 5.66 and 5.74 micrometers indicates a substantial conversion of said alkenyl-succinic acid to said lactone reaction product.

2. A process according to claim 1 in which the concentration of said protonating agent or electron pair acceptor is sufficient to provide from about 0.25 to 1.5 moles of protons or electron pair acceptors per mole of said alkenylsuccinic acid.

3. A method according to claim 1 in which the concentration of said protonating agent or electron pair acceptors is sufficient to provide from about 0.5 to 1 moles of protons or electron pair acceptors per mole of said alkenyl-succinic acid.

4. A method according to claim 1 in which the average molecular weight of said alkenyl radical ranges from about 700 to 2,000.

5. A method according to claim 1 in which the average molecular weight of said alkenyl radical ranges from about 800 to 1200.

6. A method according to claim 1 in which said protonating agent is concentrated sulfuric acid.

7. A method according to claim 6 in which said protonating agent is 96 percent sulfuric acid.

8. A method according to claim 1 in which said reaction is conducted at a temperature ranging from about 60° to 100° C.

9. A method according to claim 1 in which said reaction is conducted at a temperature ranging from about 90° to 99° C.

10. A method according to claim 1 in which equimolar amounts of an alkenylsuccinic anhydride and water are reacted to form said alkenylsuccinic acid.

11. A method according to claim 1 in which said reaction mixture is dissolved in an inert hydrocarbon solvent.

12. A method according to claim 11 in which said solvent is a mineral oil.

13. A method according to claim 1 in which infrared radiation absorption characteristics of lactone at about 5.61 and 5.74 micrometers indicates the conversion of at least 50 percent of said alkenylsuccinic acid to said lactone reaction product.

14. A method according to claim 1 in which said reaction mixture contains less than about 5 percent water.

15. A method according to claim 1 in which said reaction mixture contains less than about 2 percent water.

16. A method according to claim 1 in which said alkenyl radical has an average molecular weight ranging from about 1,000 to 3,000.

17. A method according to claim 13 in which the yield of lactones from said alkenylsuccinic acid is greater than 85 mole percent.

* * * * *